Aug. 4, 1942.　　W. H. KITTO ET AL　　2,291,728
REFRIGERATION
Filed March 21, 1940　　3 Sheets-Sheet 2

INVENTOR
*William H. Kitto &*
BY *Ralph C. Osborn*
*Harry S. Duncan*
ATTORNEY

Aug. 4, 1942.      W. H. KITTO ET AL      2,291,728
REFRIGERATION
Filed March 21, 1940      3 Sheets-Sheet 3
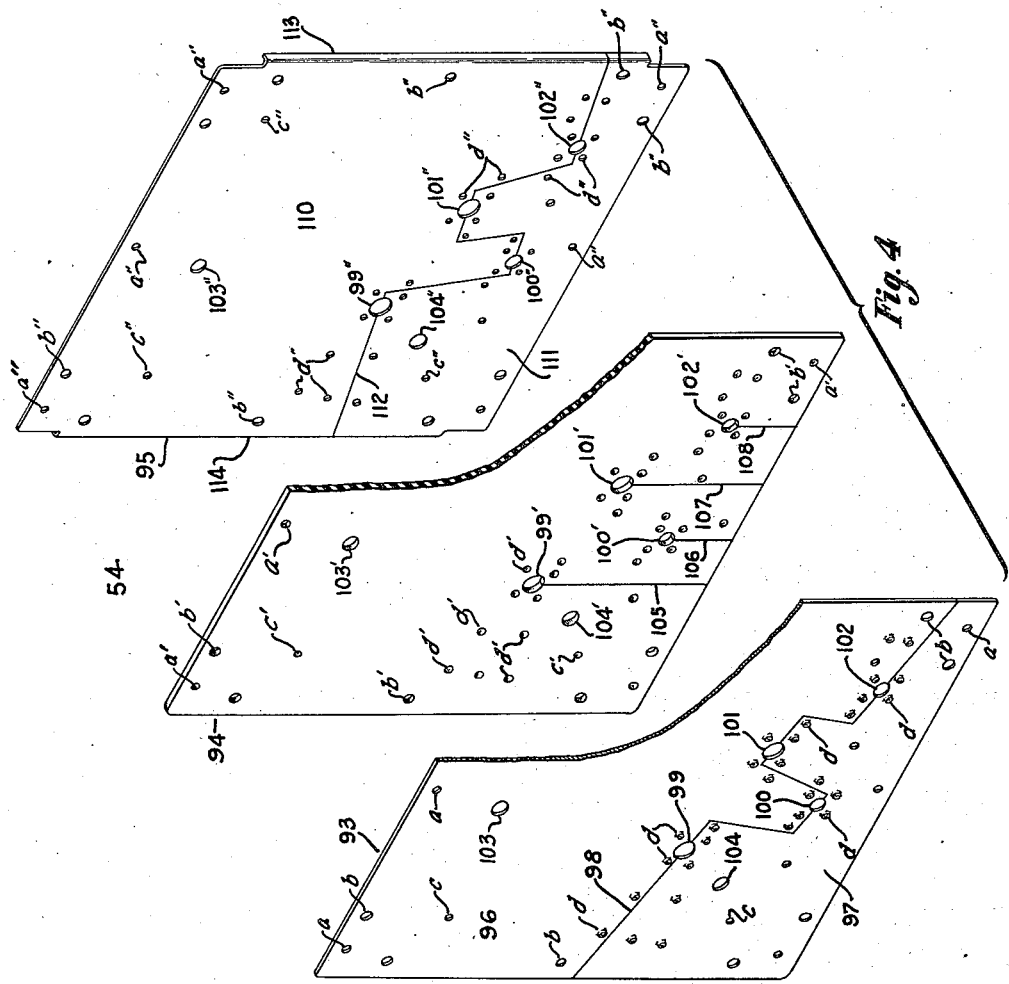
INVENTOR
William H. Kitto &
BY Ralph C. Osborn
Harry S. Dumarsh
ATTORNEY Patented Aug. 4, 1942

2,291,728

UNITED STATES PATENT OFFICE 2,291,728

REFRIGERATION

William H. Kitto, Canton, and Ralph C. Osborn, North Canton, Ohio, assignors to The Hoover Company, North Canton, Ohio Application March 21, 1940, Serial No. 325,136

17 Claims. (Cl. 62—89)

This invention relates to the art of refrigeration and more particularly to three-fluid absorption refrigerating systems in which all parts are rigidly attached together and are assembled with a suitable cabinet construction.

Prior refrigerating apparati present very difficult problems when an attempt is made to assemble them with an insulated cabinet for domestic use. These difficulties are particularly true of the so-called three-fluid absorption type refrigerating systems in which several rather large conduits must pass into the interior of the storage compartment to connect to the evaporator. In prior constructions it has been found that large quantities of water condense and collect in the insulation of the cabinet, thereby effectively destroying the insulating properties of the insulating material. This phenomena is most pronounced with insulating material which is hygroscopic. However, even with non-hygroscopic material the insulating material will become substantially useless for its intended function after a period of time unless a construction is provided which will inhibit the collection of moisture in the insulating material.

It has been found to be physically impossible to seal the insulating material perfectly as this amounts to maintaining a vacuum, with respect to water vapor, in the entire body of insulating material in the refrigerator.

In accordance with the present invention the problem of moisture collection in the insulating material is solved by effectively sealing the insulating body of the cabinet from the exterior by providing efficient seals around the window opening in the cabinet which is provided to admit the evaporator to the interior thereof and by providing effective seals around the various conduits which must pass through the window to the evaporator control bulb and the like. Further, the problem of moisture condensation is effectively solved by failing to seal the insulating body from the interior of the chamber. As a consequence of this, the humidity within the insulating body cannot rise appreciably above the humidity prevailing in the region of the evaporator which is very low in the ordinary refrigerator mechanism. Moreover, since the temperature within the insulating material is higher than the temperature prevailing within the region directly adjacent the evaporator, it follows that the relative humidity within the insulating material is maintained at a value such that condensation of moisture therein is a physical impossibility and the danger of deterioration of the insulating material and destruction of its insulating properties by moisture condensation is prevented.

In accordance with the present invention the refrigerating mechanism is mounted upon a rigid frame and is itself a rigid structure which supports the evaporator in a forwardly projecting position. Consequently, the evaporator is supported directly by the balance of the refrigerating mechanism. The evaporator is inserted through a window opening into the cabinet, a container is placed around the connecting pipe which will hold insulation, a built-up sealing panel is arranged to seal the exterior face of the window opening, and a closure panel is arranged to close the inner face of the opening without, however, providing a hermetic seal between the insulating material of the cabinet and the interior thereof.

It is a principal object of the present invention to provide a refrigerating cabinet construction so arranged that interior and exterior closure panels for the cabinet window opening may be constructed of interfitting sheet metal plate and fibre elements whose meeting edges are provided with slots for accommodating the various conduits and the like which must pass through the window opening in order to service the evaporator.

It is a further object of the present invention to provide a refrigerating system embodying a cabinet having an evaporator receiving opening, a refrigerating mechanism which supports an evaporator within the cabinet and a frame supporting the refrigerating mechanism and a closure element for the evaporator receiving opening in the cabinet.

It is a still further object of the present invention to provide window closures of the type above described which are constructed of light weight simple metal parts which may readily be formed and which may be assembled with a minimum of difficulty.

Other objects and advantages of the invention will become apparent as the description proceeds when taken in connection with the accompanying drawings, in which—

Figure 2:
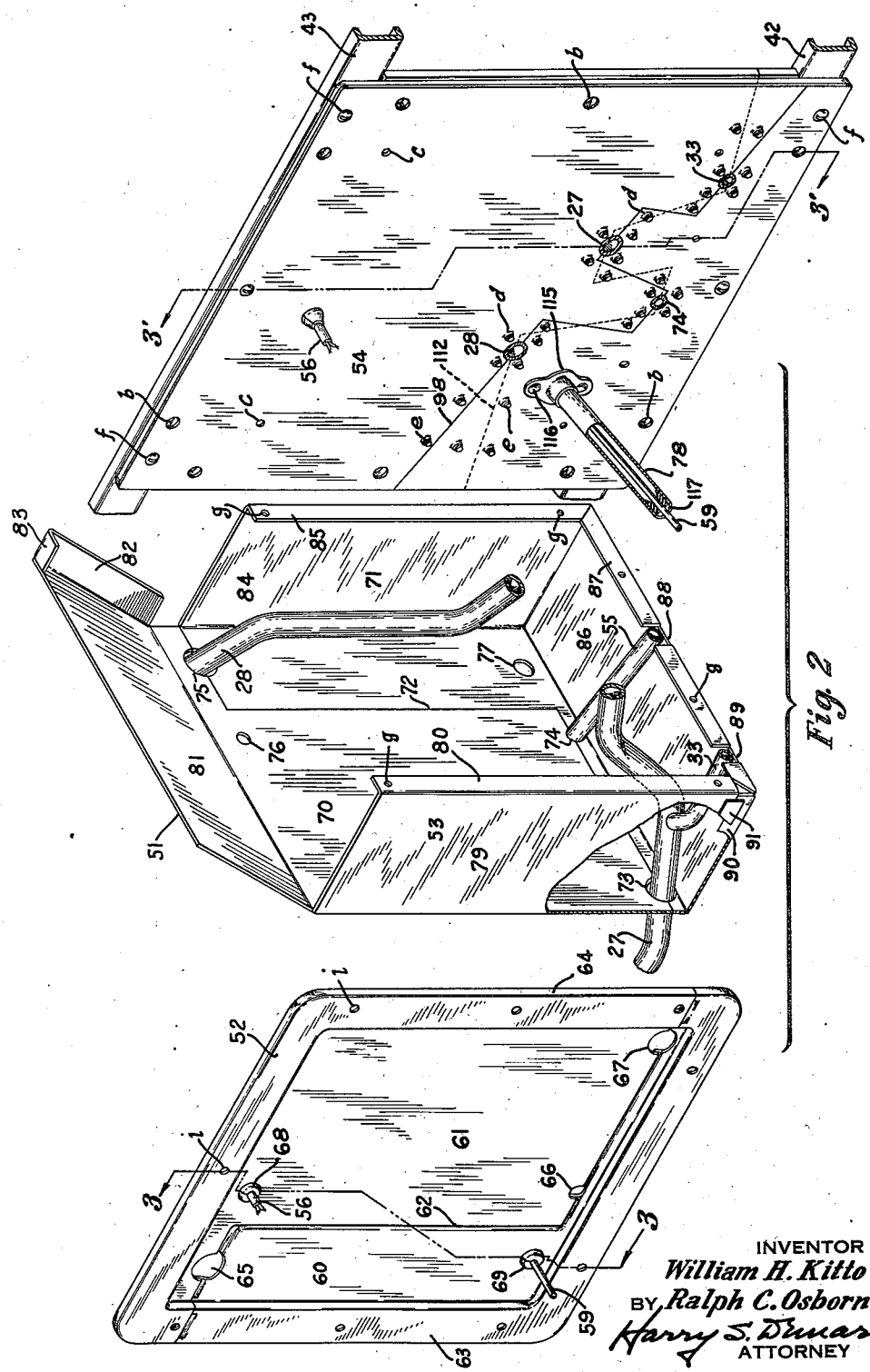
Figure 2 is an exploded view of the elements of a closure element for the cabinet.

Figure 3 is a sectional view of the assembled closure element taken on the line 3—3 and 3'—3' at the left and right hand ends, respectively, of Figure 2.

Figure 4 is an exploded view of the elements of the outer panel assembly.

Figure 1:
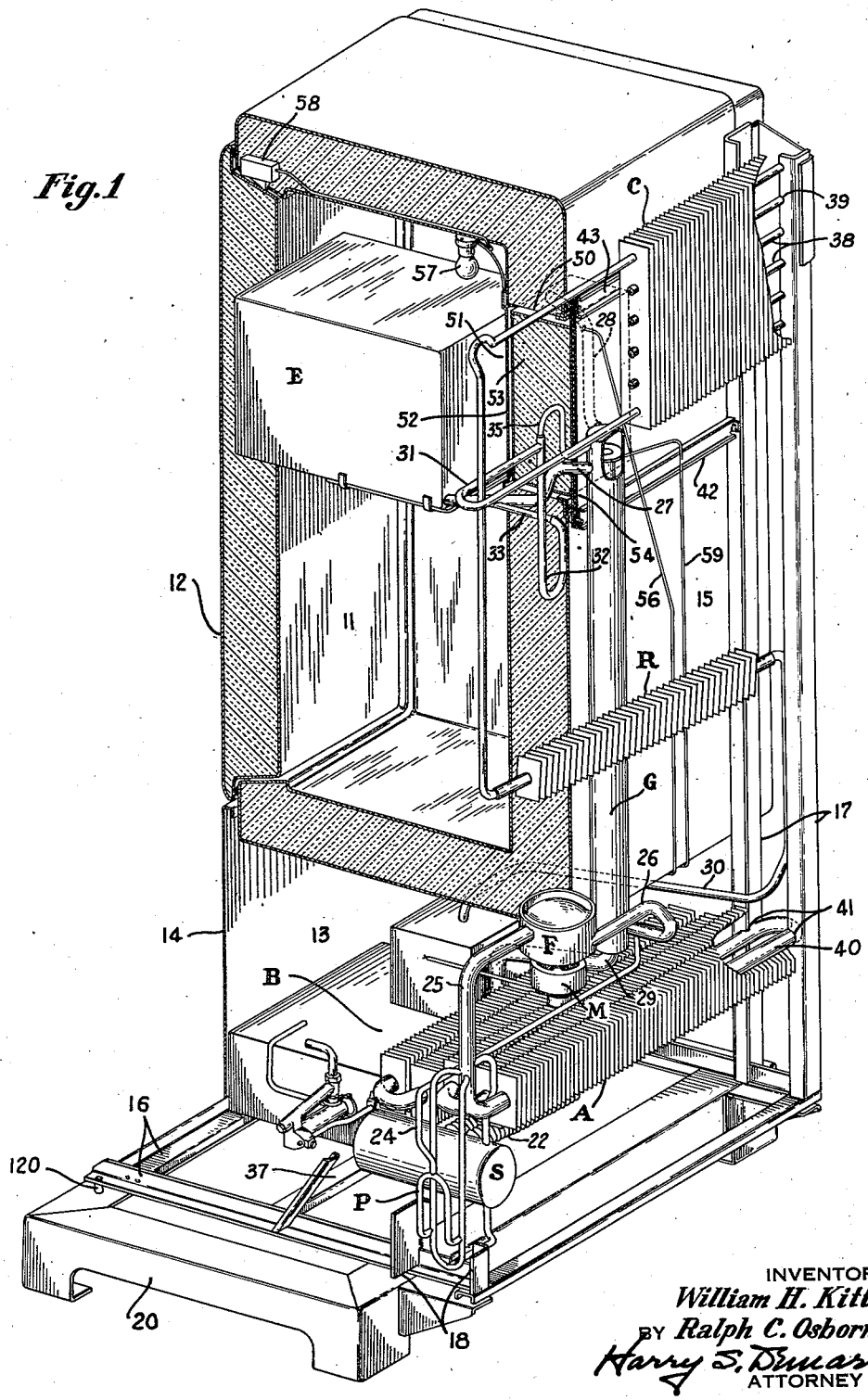
Figure 1 is a partial sectional perspective view of a complete refrigerating apparatus embodying the present invention.

Referring now to the drawings in detail and first to Figure 1 thereof, there is illustrated a cabinet construction which includes an insulated refrigerating compartment 11 provided with a front closure 12. A mechanism compartment 13 closed by a front panel 14 is positioned beneath the insulated storage compartment 11 and a rear vertically extended mechanism compartment 15 extends upwardly along the rear wall of the cabinet. A rigid refrigerating mechanism frame which comprises a rectangular base 16 and right and left hand rising angle irons 17 and 18, respectively, is associated with the cabinet construction. The base frame 16 is suitably secured to the base 20 of the cabinet and with the rising elements 17, 18 extending vertically at the side of the rear mechanism compartment 15. The framework 16, 17 and 18 is extremely rigid with the various elements thereof secured together as by bolting, riveting or welding, as may be desired.

A refrigerating mechanism is carried by the above mentioned frame. The refrigerating mechanism comprises a boiler-analyzer assembly of usual construction which is encased within an insulated body B. This assembly is supported upon the base 16 adjacent the forward portion of the compartment 13. Rearwardly and slightly above the assembly B there is provided a tubular finned air-cooled absorber A which extends beneath the lower portion of the insulated chamber 11 and also beneath the lower portion of the rear mechanism compartment 15. A solution reservoir S and twin gas lift pump assembly P is positioned slightly beneath and to one side of the absorber A. A solution precooler 22 is also positioned beneath the absorber A. A circulating inert gas fan F which is driven by an electrical motor M is positioned in the rear mechanism compartment 15 slightly above the absorber and adjacent one corner of the compartment 15. A gas heat exchanger G extends vertically in the mechanism compartment 15 and is positioned close to the rear wall of the cabinet 11. An air-cooled rectifier R extends transversely of the compartment 15 slightly below the mid portion of the height thereof. A tubular air-cooled condenser C is positioned in the upper portion of the compartment 15. An evaporator assembly and its associated casing E is positioned within the insulated compartment 11. The above constitutes the complete elements of a three-fluid absorption refrigerating system. These elements are suitably connected by a plurality of conduits to form a plurality of gas and liquid circuits constituting a complete refrigerating system.

The apparatus includes the usual solution circuit including the pump P, boiler-analyzer assembly B, precooler 22, the solution reservoir S and the absorber A. However, as this is conventional insofar as the present application is concerned, it has not been illustrated in detail herein.

An inert gas circuit is also provided which includes the absorber, circulating fan F and evaporator E. The lean inert gas formed in the absorber is conveyed therefrom to the bottom portion of the evaporator E by way of the conduit 25, the circulating fan F, the discharge conduit 26 of the circulating fan F, the outer pass of the gas heat exchanger G, and the evaporator supply conduit 27. The rich gas formed in the evaporator E is conveyed from the top portion thereof by means of the rich gas conduit 28, the inner pass of the gas heat exchanger G, and the conduit 29 which connects to the lower end of the absorber A in the usual manner. A conduit 24 is also provided for conveying gas under pressure from the conduit 26 to the pump P for operating the same.

The refrigerant vapor which is produced in the boiler B is conveyed therefrom to the upper portion of the condenser C by way of the conduit 30 which includes the rectifier R. The condensate formed in the condenser is conveyed from the bottom portion thereof into the bottom portion of the evaporator E by way of the conduit 31, the U-shaped pressure balancing conduit 32 and a connecting conduit 33. The condenser side of the U-shaped conduit 32 is provided with a vent 35 which connects to the rich gas or low pressure side of the gas heat exchanger G.

Only so much of the refrigerating system as is of importance and is directly concerned with the present invention has been described in detail herein. The system herein described is identical with that disclosed and claimed in the co-pending application of Justice H. Beach, Serial No. 220,204, filed July 20, 1938.

Refrigerating system of the type here under consideration operate at very high pressures as a consequence of which they must be made of heavy steel tubing and must be hermetically sealed, wherefore after assembly the entire apparatus is welded into an integral whole which is very rigid because of the heavy tubing elements which are utilized to form the same. Because of this construction the inert gas conduits 27 and 28 which connect to the evaporator are sufficiently heavy and rigid to support the evaporator and no other supporting means is provided therefor.

The whole refrigerating apparatus is suitably attached to the frame 16, 17 and 18. The boiler-analyzer assembly B rests upon the front element of the base frame 16 and upon a central cross-connecting brace 37.

The return bends of the condenser tube 38 are fitted into notches 39 in the rear ones of the vertically extending channel irons 17 and 18, only one set of which is shown, and may be welded to the rear ones of the elements 17 and 18, if desired. The rear two absorber tubes 40 are welded, as is indicated at 41, to the vertical elements 17 and 18 of the frame.

Various other elements of the apparatus, such as the pump assembly, the rectifier, the tube 30 and the like may be welded to the frame at various points as may be desired.

As a result of this construction an extremely rigid strong assembly is provided, first, because of the rigid frame to which the refrigerating mechanism is attached and, secondly, because the refrigerating mechanism itself forms a very rigid strong assembly. It will be noted that the evaporator is supported entirely from the conduits 27 and 28 which are attached directly to the gas heat exchanger G.

Further rigidity may be added to the apparatus by welding the gas heat exchanger to the transverse channel iron 42 which is provided to support a closure element to be described hereinafter. The channel iron 42 extends between the front elements 17 and 18, respectively, with the bight of the channel facing rearwardly. A second transverse channel iron 43 identical with the channel iron 42 extends between the forward ones of the vertical channel irons 17 and 18 but at an elevation appreciably above that at which the channel iron 42 extends across the apparatus. The channel irons 42 and 43 may be secured to the rising channel irons by welding, riveting, bolting and the like.

Though it is preferred to weld the various parts of the apparatus to the frame, other means such as bolting and the like may be provided for this purpose if desired.

In assembling the apparatus the refrigerating mechanism is first completely constructed and is then assembled with the frame in the manner described heretofore.

In order to assemble the refrigerating mechanism and frame with the cabinet, it is necessary to pass the evaporator through the rear wall of the cabinet to position the same within the refrigerated compartment 11. For this purpose the cabinet is provided with a rear opening 50 of a size to permit ready movement of the evaporator therethrough. However, it is necessary to close this opening to form a complete apparatus. For this purpose the apparatus is provided with a closure assembly indicated generally at 51 which will be described in detail hereinafter.

The opening 50 may be defined by fibre insulation retaining boards 50', if desired. This construction is a matter of caution as there is little tendency for insulation, particularly packaged insulation, to fall from an opening such as the opening 50.

The assembly 51 comprises an inner panel element 52, insulating box assembly 53, and a rear panel assembly 54.

As may readily be seen from Figure 1, the conduits 28 and 27 pass through the assembly 51 and the conduit 33 passes through the elements 54 of the assembly 51 and adjoins the conduit 27 within the box 53.

The panel assembly is also pierced by an evaporator drain 55, see Figure 2, which is not visible in Figure 1.

A suitable electrical connection 56 passes through the assembly 51 and connects to a light 57 which is controlled by a suitable door switch 58.

The boiler assembly B will be heated in a suitable manner as by a fluid fuel burner or an electrical cartridge heater.

The electrical motor M and a heater for the boiler B will be under the control of a suitable control mechanism, not shown, which may be mounted in the compartment 13 in a conventional manner and will be provided with suitable electrical and fuel connections. In order that the control may respond to refrigeration demand, a capillary tube 59 will extend from the control to a bulb located on or adjacent the evaporator E and will pass through the assembly 51.

Referring now to Figure 2 wherein the assembly 51 is shown in detail, it is evident that the panel element 52 comprises a lower section 60 and an upper section 61 which meet in a lap joint 62. The elements 60 and 61 each comprise a peripheral flange 63 and 64, respectively, and a central dished portion. The joint 62 is a lap joint only in the dished portion. The joint 62 in the flanges is merely a butt joint. The panels 60 and 61 are formed with complementary slot openings from the joint 62 to form openings 65, 66 and 67 to receive the conduits 28, 55 and 27, respectively. Suitable openings which are provided with rubber grommets as is indicated generally at 68 and 69 are provided to receive the electrical conductors 56 and the capillary tube 59, respectively. The flanges 63 and 64 are provided with holes i to admit securing bolts to be described hereinafter.

The central insulation housing element 53 of the window closure 51 is in the form of a light weight box or casing, which is preferably constructed from fibreboard, composed of a pair of complementary sections 70 and 71 which meet in a butt joint, as is indicated at 72, which passes along the rear wall of the element 53. The elements 70 and 71 are provided with slots opening from the edges of the joint 72 to form openings 73, 74 and 75 for receiving the conduits 27, 55 and 28, respectively. The rear wall portion of the element 70 is provided with an opening 76, which is designed to receive the electrical conductor 56 and the rear wall portion of the element 71 is provided with an opening 77 which is designed to receive the capillary tube 59 and a tubular housing 78 which surrounds the capillary tube in its passage through the body of insulating material which is housed within the element 53.

The section 70 of the element 53 comprises the rear wall joint forming portion, the left hand side flange 79, an inwardly extending front flange 80, and a top plate 81 which is provided on its right hand end with a downwardly extending flange 82 and at its front with a short flange portion 83.

The section 71 of the element 53 comprises the aforementioned rear wall portion, a right hand side wall portion 84 which terminates in a flange portion 85 designed to cooperate with the above mentioned flange 83. The element 71 also includes a bottom wall portion 86 which includes an upwardly extending inner flange 87 provided with slots 88 and 89 to receive the conduits 55 and 33, respectively, and a left hand end flange 90 designed to cooperate with the side walls 79. The flanges 80, 85 and 87 are provided with openings g to receive suitable securing rivets to which reference will be made in more detail hereinafter.

When the element 51 is in assembled relation the joint 72 will be covered with a suitable adhesive binding tape, the top wall 81 will be swung downwardly to bring the flanges 82, 84 and 83, 85, respectively, into engagement and the joints there will also be covered with an adhesive tape. Likewise the joint between the side walls 79 and the flange 90 will be covered with a suitable adhesive tape to maintain the box 53 in assembled relationship. The binding tape is indicated generally at 91 where it secures the flange 90 and panel 79 in assembled relation.

Referring now to Figure 4, there is shown an exploded view of the third element 54 of the closure construction 51. The element 54 comprises a sheet metal plate element 93, a rubber sheet element 94 and a second sheet metal plate element 95.

The sheet metal plate 93 is composed of an upper section 96 and a lower section 97. These sections meet in a staggered butt joint indicated at 98. The plates 96 and 97 are provided with complementary slots opening inwardly from the edges of the joint 98 to form openings 99, 100, 101 and 102 for receiving the conduits 28, 55, 27 and 33, respectively.

The section or plate 93 is provided with a plurality of peripheral openings *a* which, as will be explained more fully later, are designed to accommodate bolts for attaching the element 54 to the channel irons 42 and 43. The plate 93 is also provided with a plurality of larger openings *b* which will accommodate elements for attaching the plate member 54 to the cabinet. The section plate 93 is provided with another group of openings *c* which accommodate means for attaching the box element 53 thereto. A third group of flanged openings *d* are internally threaded and cluster along the joint 98 and around the openings 99 to 102, inclusive, for a purpose to be described more fully hereinafter.

The section 96 of the panel 93 is provided with an opening 103 for accommodating the electrical conductors 56 and the panel 97 is provided with an opening 104 for accommodating the capillary conduit 59 and a suitable cushioning grommet.

The plate 94 of the panel element 54 is preferably composed of sheet rubber stock which is not sectioned but which is provided with openings corresponding identically with the openings described immediately above in connection with the plate element 93. The openings in the rubber sheet element 94 are therefore given the same reference characters primed as openings described above in the plate 93. All of these openings are identical with those in the plate 93 except that the openings *d'* of the plate 94 are not threaded or flanged.

The plate 94 is provided with slits 105, 106, 107 and 108 which connect the bottom end of the plate with the openings 99', 100', 101' and 102', respectively, whereby the rubber sheet may be readily slipped over the conduits 28, 55, 27 and 33, respectively.

The rear panel 95 of the panel element 54 is composed of an upper section 110 and a lower section 111. The sections 110 and 111 are joined by a staggered butt joint 112 which, however, is staggered in such a manner that the same will never coincide with though it will cross the joint 98 of the panel element 93 when the panel elements 93 and 95 are in assembled relationship. The relationship of these joints is illustrated in the assembled view of the panel element 54 included in Figure 2 where the butt joint 98 appears in solid outline and the butt joint 112 appears in dotted outline.

The panel element 95 is provided with openings 99'' to 104'' which correspond respectively to the openings 99 to 104. The panel 95 is also perforated identically with the panel 93 and corresponding openings are given the same reference characters double primed. However, it will be appreciated that the openings *d''* are neither threaded nor flanged, as is the case with the openings previously described.

The panel 95 is also provided with rearwardly turned flanges 113 and 114 on the right and left hand sides thereof respectively, as viewed in Figure 4. These flanges terminate short of the ends of the panels 110 and 111 and are designed to fit between the transverse channel irons 42 and 43.

Referring now to Figure 2 wherein the assembled relationship of the panel structure 54 is illustrated, it will be noted that the tube 78 which houses the capillary tube 59 is secured to the inner face of the panel structure 54 by a socket element 115 which is riveted to the panel 54 by means of suitable rivets 116 to provide a rigid support for the small capillary tube. The capillary tube is spaced within the tube 78 by suitable rubber grommets 117, only one of which is shown.

The apparatus is assembled in the following manner: The refrigerating mechanism is secured to the frame in the manner described heretofore. The panel 54 is next assembled to the frame and the refrigerating apparatus as follows: The rubber sheet 94 is placed around the various conduits which pierce the same by slipping them into the holes provided therefor through the slits communicating the bottom edge of the plate with each of the conduit receiving holes. The rear plate 95 is then mounted on the tubes by passing the upper section 110 thereof downwardly over the tubes and by passing the lower section 111 thereof upwardly over the tubes. While the elements of the panel 95 are held in place, the panel 93 is assembled with the conduits in a similar manner but in front of the rubber sheet. Next the panels are secured together and are drawn together by passing suitable bolts *e* through the holes *d''*, *d'* and screwing them into the threaded holes *d*. This procedure will secure the elements 93, 94 and 95 together and will also secure the upper and lower sections 110, 111 and 96, 97 of the plates 95 and 93, respectively, together as the butt joints 98 and 112 are staggered in such fashion that certain of the holes *d''* which are in the upper section of the plate 95 will extend into holes *d* in the lower section of the plate 93 and vice versa. As the bolts *e* are drawn tight, the rubber plate will be squeezed between the two metal plates 93 and 95 and will force the rubber to make a tight sealing joint around the perimeter of the various conduits passing through the panel assembly 54. The tube 78 is next secured to the panel 54, the capillary tube 59 is threaded through tube 78 and the split grommets 117 are inserted in the tube 78.

The panel assembly 54 is secured to the channel irons 42 and 43 of the frame by passing suitable bolts *f* through the holes *a* in the plate 54 and threading them into previously threaded holes in the channel irons 42 and 43 which further draws the elements of the panel 54 together, further squeezes the rubber plate 94 and also of course secures the whole assembly 54 to the frame of the refrigerator.

The insulation casing element 53 is next assembled to the extent shown in Figure 2 around the conduits 27, 28 and 55. The flanges 80, 83, 85 and 87 are next riveted to the panel element 54 by suitable rivets *h* which are passed through the holes *g* formed in the panels 80, 87, and 85 and the holes *c* formed in the panel 54. In this connection it is to be noted that the tube 78 is of such length that it will just extend through the openings 77 in the rear wall of the insulation casing 53. The insulation casing 53 is now assembled to the panel 54. The electrical conduit 56 is threaded through the holes 103 and 76 and a split grommet is mounted in the hole 103.

The casing 53 is now filled with insulation by inserting the same through the open top 81 of the casing 53. After the casing 53 has been filled with insulating material the top panel 81 is closed down and the joint of that panel with the panel 79, the panel 84 and the joint formed by the flange 82 are secured together with a suitable adhesive tape. The insulating material is now firmly secured to the framework of the apparatus.

The refrigerating mechanism is now ready to be assembled with the cabinet and for this purpose it is inserted into the cabinet from the rear, the evaporator passing through the opening 50 and the frame of the apparatus resting upon the base frame 20 of the cabinet construction to which it is secured by suitable bolts and spacing members indicated generally at 120.

The opening 50 of the cabinet is defined by a rear channel frame 121 which lies inside of and against the sheet metal rear panel 122 of the cabinet. The inner face of the opening 50 is provided with a flat rectangular metal frame member 123 which lies against the inner sheet metal wall 124 of the compartment 11. The frame 121 is secured to the sheet metal panel 122 by suitable internally threaded rivets 125.

A suitable gasket 126, preferably of rubber, is positioned around the rear face of the opening 50 in the cabinet and inside the perimeter defined by the bolts f and rivets 125. When the apparatus is assembled the frame and panel structure is secured to the cabinet by bolts 127 which pass through openings formed for the purpose in the channel irons 42 and 43 through the openings b of the panel 54 and are threaded into the rivets 125, thereby to draw the panel assembly tightly against the gaskets 126 to form a tight joint therearound and to firmly secure the upper portion of the refrigerating mechanism and frame to the cabinet.

The electrical conduit 56 and the capillary tube 59 are next threaded through the panel element 52 and the grommets 68 and 69 are secured in position. The panel sections 60 and 61 are then fitted around the conduits 28, 55 and 27 after which a gasket 130, preferably of rubber, is placed within the channel flanges 63 and 64 of the elements 60 and 61, respectively, and is fitted around the heads of internally threaded rivets 132 which secure the frame 123 to the inner wall 124 of the compartment 11. Suitable threaded bolts 133 are then passed through the openings i in the flanges 63 and 64 and are screwed into the rivets 132, thus securing the two sections of the inner panel 52 together and securing the same to the inner wall of the compartment 11. The function of the gasket 130 is to protect the finished inner face of the liner 124 of the storage compartment from pressure by the flanges of the panel 52. This is not a hermetic sealing gasket as there is no hermetic seal provided around the pipe openings in the panel 52, nor is it intended that a hermetic seal shall be provided between the compartment 11 and the space behind the panel 52.

The entire refrigerating mechanism is now in assembled position and is ready for operation. It will be appreciated that the insulating portion of the cabinet is provided with a hermetic seal by reason of the panel 54 and its associated sealing gasket 126, whereby leakage between the atmosphere and the interior of the insulating portion of the cabinet is held to an irreducible minimum. On the other hand, the insulating space of the cabinet is partially open to and is able to breathe into and out of the compartment 11. Moreover, due to the low humidity which is maintained in the compartment 11 in the area immediately adjacent the evaporator which includes the area occupied by the panel 52, moisture finding its way into the insulating body of the refrigerator will be collected on the evaporator and will thereby maintain the insulating material of the cabinet in a dry condition which is necessary if the insulating material is to operate at maximum efficiency. It will also be appreciated that the insulating material will always be at a higher temperature than that prevailing within the compartment 11 and that the liner 124 will always be at a higher temperature than the temperature of the evaporator, wherefore there will be no tendency for moisture to condense within the body of insulating material to destroy its efficiency.

Another important feature of the present invention results from the fact that the evaporator per se is entirely supported from other portions of the refrigerating mechanism, thus eliminating the necessity for support within the refrigerating compartment and eliminating the necessity for separate supporting means to the evaporator. However, the sealing construction constituting the element 51, though it surrounds and seals the evaporating connecting conduit, is supported entirely from the refrigerator frame, thus relieving the evaporator of any load attributable to the window closure element 51 and also serving as an auxiliary means for binding the refrigerator supporting frame to the cabinet construction, all of which contribute to form a very rigid and stable assembly.

By thus providing a hermetic seal to the exterior of the refrigerator cabinet insulating space and allowing the same to have restricted communication through the various openings of the panel 52 with the interior of the refrigerated compartment, leakage of moisture into the insulating material is held to an irreducible minimum and an arrangement is provided which will continuously maintain the humidity within the insulating space far below the dew point so that a body of dry insulating material is positively assured under all conceivable operating conditions and the initial efficiency of the refrigerator cabinet will be maintained unimpaired throughout its useful life.

Though the invention has been illustrated and described herein in appreciable detail, it is to be understood that various alterations may be made in the construction, arrangement and proportion of parts without departing from the spirit of the invention or the scope of the attached claims.

We claim:

1. In a refrigerator, a rigid frame, a rigid refrigerating mechanism secured to said frame including outwardly projecting rigid fluid conveying means and an evaporator open to and carried by said conveying means, a cabinet including an insulated cooling chamber housing said evaporator, an opening in a wall of said cooling chamber for admitting said evaporator, an insulated closure structure positioned within said opening around said conveying means and arranged to seal the opening from the exterior of said chamber and to form a hermetic exterior seal around said conveying means, said structure being supported by said frame, and means for securing said frame to said cabinet.

2. In a refrigerator, a rigid frame, a rigid refrigerating mechanism secured to said frame and including an outwardly projecting evaporator, a cabinet including an insulated cooling chamber housing said evaporator, an opening in a wall of said cooling chamber for admitting said evaporator, an insulated closure structure positioned within said opening and arranged to seal the opening from the exterior of said chamber, said structure being supported by said frame, means for securing said frame to said cabinet, and an inner closure panel for said opening secured to the inner wall of said cooling chamber.

3. The combination with a refrigerator including an insulated chamber having a cooling unit receiving opening and a cooling unit within said chamber supported by conduits passing through said opening of means for closing said opening including an inner panel composed of a plurality of interfitting sections supported from the inner wall of said chamber and provided with slots opening from the interfitting edges of said sections for receiving said conduits, a body of insulating material in said opening, and an outer panel composed of a plurality of jointed sections provided with conduit receiving slots opening from the jointed edges thereof.

4. In a refrigerating apparatus, a rigid frame, a rigid refrigerating mechanism secured to said frame and including an evaporator rigidly supported by other portions of the refrigerating mechanism and projecting outwardly thereof, an insulated panel structure rigidly supported by said frame behind said evaporator, a cabinet including an insulated storage chamber receiving said evaporator and having a wall opening adapted to admit said evaporator, said panel being located in said opening and substantially filling the same, a second panel secured to the inner wall of said chamber and closing the inner face of said opening, and means securing said frame to said cabinet.

5. In a refrigerating apparatus including an insulated storage compartment housing an evaporator which is supported exteriorly of the compartment by rigid members extending through an opening in the wall of the compartment, a body of insulating material substantially filling said opening and surrounding said rigid members, an inner sectional panel closing the inner face of said opening and surrounding said rigid members, an outer sectional panel closing the outer face of said opening and constructed and arranged to seal said opening from the atmosphere.

6. Refrigerator construction comprising a three-fluid refrigerating mechanism including a projecting evaporator rigidly supported from the mechanism by a pair of inert gas conduits, a cabinet including an insulated storage chamber housing said evaporator and provided with an opening to permit passage of said evaporator into said chamber, closure means for said chamber opening comprising a panel construction which is divided to fit around said conduits and to seal the same against passage of air therearound, a body of insulating material substantially filling said opening and supported by said panel construction, means for attaching said panel construction to the outer face of said storage chamber to seal said opening hermetically and a finishing panel within said chamber for closing the inner face of said opening.

7. Refrigerator construction comprising a three-fluid refrigerating mechanism including a projecting evaporator rigidly supported from the mechanism by a pair of inert gas conduits, a cabinet including an insulated storage chamber housing said evaporator and provided with an opening to permit passage of said evaporator into said chamber, closure means for said chamber opening comprising a panel construction which is divided to fit around said conduits and to seal the same against passage of air therearound, a body of insulating material substantially filling said opening and supported by said panel construction, means for attaching said panel construction to the outer face of said storage chamber to seal said opening hermetically and a finishing panel within said chamber for closing the inner face of said opening, said finishing panel comprising a plurality of sections arranged to overlap at a joint which includes said inert gas conduits.

8. Refrigerating apparatus comprising an insulated storage chamber sealed from the atmosphere except for an opening adapted to receive an evaporator, a refrigerating mechanism supported upon a rigid frame, said refrigerating mechanism including an evaporator in said storage chamber rigidly supported from said mechanism by connecting conduits which pass through said opening, a closure for said opening comprising a body of insulating material, a rear panel, means for hermetically sealing the rear of said opening and sealed to said conduits, and an inner panel member closing the inside of said opening without sealing the same whereby to allow the insulation of said chamber to breathe thereinto and to be maintained in dry condition by the evaporator.

9. That method of assembling a refrigerating mechanism of the type which is mounted on a rigid frame and includes a projecting evaporator with a cabinet including an insulated chamber provided with an opening adapted to receive the evaporator which includes the steps of inserting the evaporator through the chamber opening, paneling the outer face of the opening and hermetically sealing the same, and paneling the inner face of the opening without hermetically sealing the interior of the chamber from the insulation thereof.

10. In combination, a refrigerator including an insulated cooling compartment having a cooling unit receiving opening, a cooling unit within said compartment, rigid supporting means for said cooling unit extending through said opening, an insulated closure construction for said opening comprising an outer panel construction sealed to the outer face of said opening and to said rigid supporting means, a body of insulating material within said opening, and an inner finishing panel which does not seal the compartment from its insulation.

11. In combination, a refrigerator including an insulated cooling compartment having a cooling unit receiving opening, a cooling unit within said compartment, connections to said cooling unit extending through said opening, an insulated closure construction for said opening comprising an outer panel construction which is composed of a plurality of sections which meet in a joint including recessed portions receiving said connections, an inner panel construction which is composed of a plurality of sections which meet in a joint including recessed portions for receiving said connections, and an intermediate insulating portion.

12. In combination, a refrigerator including an insulated cooling compartment having a cooling unit receiving opening, a cooling unit within said compartment, rigid supporting means for said cooling unit extending through said opening, an insulated closure construction for said opening comprising a plurality of complementary plates constructed to meet in a joint which includes cut-out portions for embracing said supporting means, means securing said plates against the outer wall of said chamber, a body of insulating material in said opening, a second group of complementary plates constructed to meet in a joint which includes cut-out portions for embracing said supporting means, and means for securing said second group of panels against the inner wall of said compartment.

13. In combination, a refrigerator including an insulated cooling compartment having a cooling unit receiving opening, a cooling unit within said compartment, rigid supporting means for said cooling unit extending through said opening, an insulated closure construction for said opening comprising an outer panel construction sealed to the outer face of said opening and to said rigid supporting means, a body of insulating material within said opening, an inner finishing panel which does not seal the compartment from its insulation, said outer panel construction comprising a pair of plates each of which is composed of a pair of complementary sections which meet in a staggered butt joint, recesses opening from the edges of said butt joint in each plate and embracing said supporting means, the butt joints in said plates being staggered in non-coincidental relationship except at their recessed portions whereby there is no straight joint line through said panel, and means for securing said sections in assembled relationship.

14. In combination, a refrigerator including an insulated cooling compartment having a cooling unit receiving opening, a cooling unit within said compartment, rigid supporting means for said cooling unit extending through said opening, an insulated closure construction for said opening comprising an outer panel construction sealed to the outer face of said opening and to said rigid supporting means, a body of insulating material within said opening, an inner finishing panel which does not seal the compartment from its insulation, said outer panel construction comprising a pair of plates each of which is composed of a pair of complementary sections which meet in a staggered butt joint, recesses opening from the edges of said butt joint in each plate and embracing said supporting means, the butt joints in said plates being staggered in non-coincidental relationship except at their recessed portions whereby there is no straight joint line through said panel, a gasket interposed between said plates and cut to embrace said supporting means snugly, and a plurality of securing elements piercing said plates and gasket, said securing elements being so located with respect to said staggered butt joints that each section of each plate is firmly secured to each section of the other plate and said gasket is squeezed into a tight sealing joint.

15. In combination, a refrigerating cabinet having insulated walls enclosing a cooling chamber, a cooling unit in said chamber, an opening in a wall of said chamber to allow said cooling unit to be inserted into said chamber, and closure means for said opening including means for hermetically sealing the exterior of said opening and for closing the interior of said opening without hermetically sealing the same whereby air may pass back and forth between said chamber and the insulation in said walls and the moisture content thereof is maintained below the dew point at the temperature of the walls of said cabinet by said cooling unit.

16. In combination, a refrigerating cabinet including a plurality of hollow walls defining a cooling chamber, a cooling unit in said chamber, an opening in one of said hollow walls to allow said cooling unit to be inserted into said chamber, insulating material in said hollow walls, cooling medium supply and removal connections for said cooling unit passing through said opening, and insulated closure means for said opening including means for hermetically sealing the insulation space of said hollow wall and of said closure from the atmosphere surrounding said cabinet, and means for closing the inner surface of said wall at said opening non-hermetically to allow communication between the interior of said chamber and the insulation space of said hollow walls.

17. In combination, a refrigerating cabinet including a plurality of hollow walls defining a cooling chamber, a cooling unit in said chamber, an opening in one of said hollow walls to allow said cooling unit to be inserted into said chamber, insulating material in said hollow walls, cooling medium supply and removal connections for said cooling unit passing through said opening, closure means for said opening comprising an exterior element constructed of a plurality of interfitting parts constructed and arranged to provide a hermetic seal for the exterior of said hollow wall at said opening and around said cooling medium connections, means cooperating with said exterior element to provide an insulating body in said opening, and an inner element constructed of complementary parts arranged to fit around said cooling medium connections providing an inner cover for said opening without preventing communication between the interior of said chamber and the insulation space of said hollow walls.

WILLIAM H. KITTO.
RALPH C. OSBORN.